United States Patent [19]

Mark

[11] 4,220,583

[45] Sep. 2, 1980

[54] TRANSLUCENT, FLAME-RETARDANT POLYCARBONATE COMPOSITIONS

[75] Inventor: Victor Mark, Evansville, Ind.

[73] Assignee: General Electric Company, Pittsfield, Mass.

[21] Appl. No.: 967,088

[22] Filed: Dec. 6, 1978

[51] Int. Cl.$^2$ .................. C08K 3/30; C08L 57/08; C08L 69/00

[52] U.S. Cl. .................. 260/45.7 S; 260/45.7 R; 260/45.7 PS; 260/45.75 B; 260/45.8 R; 260/45.8 A; 260/45.8 N; 260/45.8 SN; 260/45.8 NZ; 260/45.85 H; 260/45.85 S; 260/45.9 R; 260/45.95 G; 525/151

[58] Field of Search .......... 260/873, 900, 899, 45.7 S, 260/45.7 PS, 45.7 R, 45.75 B, 45.8 R, 45.8 A, 45.8 N, 45.8 SN, 45.8 NZ, 45.85 H, 45.85 S, 45.9 R, 45.95 G; 525/151

[56] References Cited

U.S. PATENT DOCUMENTS

| | | | |
|---|---|---|---|
| 2,820,772 | 1/1958 | Barnhart | 260/900 |
| 3,005,795 | 10/1961 | Busse | 525/68 |
| 3,437,631 | 4/1969 | Cleveland | 260/873 |
| 3,651,174 | 3/1972 | Bulores | 260/45.7 R |
| 3,933,730 | 1/1976 | Hoojeboom | 525/68 |

*Primary Examiner*—J. Ziegler
*Attorney, Agent, or Firm*—Salvatore C. Mitri; William F. Mufatti

[57] ABSTRACT

Translucent and flame-retardant polycarbonate compositions comprising an admixture of an aromatic polycarbonate, minor amounts of a partially fluorinated polyolefin, and minor amounts of an organic alkali metal salt or an organic alkaline earth metal salt or mixtures thereof.

10 Claims, No Drawings

TRANSLUCENT, FLAME-RETARDANT POLYCARBONATE COMPOSITIONS

This invention is directed to translucent, flame-retardant polycarbonate compositions comprising an admixture of an aromatic polycarbonate, a minor amount of a partially fluorinated polyolefin and a minor amount of an organic alkali metal salt or an organic alkaline earth metal salt or mixtures thereof.

BACKGROUND OF THE INVENTION

Translucent polycarbonate can be manufactured for internally illuminated signs, protective light diffusers for fluorescent, incandescent or gaseous discharge lamps, translucent window lights, and the like.

It is known in the art that polycarbonate resins can be rendered translucent by the use of one or more inorganic additives such as titanium dioxide, zinc oxide, lead carbonate, lithopone, talc, etc., either alone or in combination. However, all of these inorganic salts produce translucent formulations which are not completely satisfactory as they are deficient in one or more properties. For example, at the high temperatures normally encountered during manufacturing, many of these inorganic light diffusers are chemically reactive and degrade the desirable physical and optical properties of the polycarbonate composition.

In making a translucent formulation, many variables are to be considered; e.g., the color of the light reflected from the surface of a molded part, the color and intensity of the light transmitted through the molded part, and particularly, the radial energy distribution of light transmitted through a molded part from a parallel beam of light. An ideally diffuse part, when illuminated by a narrow, parallel beam of light, will exhibit a spherical energy distribution on the side opposite the impinging beam, a property especially important when it is desired to obscure the light source and present a uniformly illuminated surface. The more this distribution departs from the spherical (that is, the greater the proportion of light propagated specularly through the part), the less ideal is the part as a diffuser.

This property of a light diffuser can be measured conveniently on a G. E. Recording Spectrophotometer by measuring the diffuse light ($T_d$) transmitted through a sample, the light transmitted specularly being absorbed by a black velvet light trap placed in the external sample port, and comparing it with the total light ($T_t$) transmitted through the sample. The ratio, $T_d/T_t$, is called the diffusivity, D, of the sample. The closer this ratio approaches 1.0, the more clearly the sample approaches an ideal diffuser.

In addition, a translucent composition must also be thermally stable, retain its desirable physical toughness and impact strength and be easily processable.

Copending application, Ser. No. 967,087, filed Dec. 6, 1978 and assigned to the same assignee as this case, discloses a translucent polycarbonate composition employing a particulate, partially fluorinated polyolefin alone or mixed with poly(tetrafluoroethylene) or poly(hexafluoropropylene). The composition obtained, while exhibiting good diffuser properties, is not acceptable for many applications due to its lack of adequate flame retardancy.

It would be desirable to add to this list of properties that of flame retardancy to enable the aromatic polycarbonates to be used, among other applications, to form molded or extruded objects that are resistant to flames thereby minimizing them as a fire hazard. In particular, translucent signs, sheet products, that are often near or adjacent to electrical outlets and are in heated environments should possess flame retardant properties in order not to be the source of or contribute to fire.

DESCRIPTION OF THE INVENTION

It has now been found that a thermally stable polycarbonate composition with excellent toughness and high impact strength can be obtained by admixing a halogen-free aromatic polycarbonate and minor amounts of a partially fluorinated polyolefin and minor amounts of an organic alkali metal salt or an organic alkaline earth metal salt, or mixtures thereof. In another embodiment, the partially fluorinated polyolefin can also be admixed with polymers of tetrafluoroethylene and hexafluoropropylene.

The partially fluorinated polyolefin of the instant invention can be poly(vinylidene fluoride), poly(vinyl fluoride), poly(trifluoroethylene), poly(chlorotrifluoroethylene) and poly(trifluoroethylene alkali metal sulfonate).

For ease of blending with the polycarbonate resin, the fluorinated polyolefin or fluorinated polyolefin mixtures are preferably employed in particulate form.

The amount of partially fluorinated polyolefin which can be used is not critical and can range from about 0.01 to about 5.0 weight percent based on the weight of the polycarbonate composition.

The organic alkali metal and organic alkaline metal salts or mixtures thereof which can be employed are disclosed in the following U.S. Patents, all of which are assigned to the same assignee as this case and which are all incorporated herein by reference.

U.S. Pat. No. 3,933,734 which discloses a flame retardant polycarbonate composition comprising an admixture of an aromatic polycarbonate and a flame retardant additive which can be the metal salts of either monomeric or polymeric aromatic sulfonic acids, or mixtures thereof.

U.S. Pat. No. 3,948,851 discloses a flame retardant polycarbonate composition comprising an admixture of an aromatic polycarbonate and a flame retardant additive which can be the metal salts of either monomeric or polymeric aromatic sulfonesulfonic acids, or mixtures thereof.

U.S. Pat. No. 3,926,908 which discloses a flame retardant polycarbonate composition comprising an admixture of an aromatic polycarbonate and a flame retardant additive which can be the metal salts of sulfonic acids of aromatic ketones, or mixtures thereof.

U.S. Pat. No. 3,919,167 which discloses a flame retardant polycarbonate composition comprising an admixture of an aromatic polycarbonate and a flame retardant additive which can be the metal salts of heterocyclic sulfonic acids, or mixtures thereof.

U.S. Pat. No. 4,066,618 which discloses a flame retardant polycarbonate composition comprising an admixture of an aromatic polycarbonate and a flame retardant additive which can be the metal salts of a halogenated nonaromatic carboxylic acid or mixtures thereof.

U.S. Pat. No. 3,909,490 which discloses a flame retardant polycarbonate composition comprising an admixture of an aromatic polycarbonate and a flame retardant additive which can be the metal salts of sulfonic acids of aromatic sulfides, or mixtures thereof.

U.S. Pat. No. 3,953,396 which discloses a flame retardant polycarbonate composition comprising an admixture of an aromatic polycarbonate and a flame retardant additive which can be the metal salts of either monomer or polymeric aromatic ether sulfonic acids, or mixtures thereof.

U.S. Pat. No. 3,931,100 which discloses a flame retardant polycarbonate composition comprising an admixture of an aromatic polycarbonate and a flame retardant additive which can be the metal salts of aliphatic and olefinic sulfonic acids, and mixtures thereof.

U.S. Pat. No. 3,978,024 which discloses a flame retardant polycarbonate composition comprising an admixture of an aromatic polycarbonate and a flame retardant additive which can be the metal salts of either monomeric or polymeric phenol ester sulfonic acids, or mixtures thereof.

U.S. Pat. No. 4,069,201 which discloses a flame retardant polycarbonate composition comprising an admixture of an aromatic polycarbonate and a flame retardant additive which can be the metal salts of unsubstituted or halogenated oxocarbon acids, or mixtures thereof.

U.S. Pat. No. 3,953,399 which discloses a flame retardant polycarbonate composition comprising an admixture of an aromatic polycarbonate and a flame retardant additive which can be the metal salts of sulfonic acids of monomeric and polymeric aromatic carboxylic acids and esters, and mixtures thereof.

U.S. Pat. No. 3,917,559 which discloses a flame retardant polycarbonate composition comprising an admixture of an aromatic polycarbonate and a flame retardant additive which can be the metal salts of halocycloaliphatic aromatic sulfonic acids.

U.S. Pat. No. 3,951,910 which discloses a flame retardant polycarbonate composition comprising an admixture of an aromatic polycarbonate and a flame retardant additive which can be the metal salts of either monomeric or polymeric aromatic amide sulfonic acids, or mixtures thereof.

U.S. Pat. No. 3,940,366 which discloses a flame retardant polycarbonate composition comprising an admixture of an aromatic polycarbonate and a flame retardant additive which can be the metal salts of either monomeric or polymeric aromatic sulfonic acids, or mixtures thereof.

Of the salts disclosed in the U.S. Patents identified above, the preferred salts include sodium benzenesulfonate; disodium naphthalene-2,6-disulfonate; sodium p-iodobenzenesulfonate; sodium 2,4,5-trichlorobenzenesulfonate; sodium 4,4'-dibromobiphenyl-3-sulfonate; sodium 2,3,4,5,6-pentachloro-betastyrenesulfonate; sodium 4,4'-dichlorodiphenylsulfide-3-sulfonate; disodium tetrachlorodiphenyletherdisulfonate; disodium 4,4'-dichlorobenzophenone-3,3'-disulfonate; sodium 2,5-dichlorothiophene-3-sulfonate; potassium salt of diphenylsulfone-3-sulfonic acid; sodium dimethyl 2,4,6-trichloro-5-sulfoisophthalate; potassium salt of the sulfonic acid of dichlorophenyl 2,4,5-trichlorobenzene sulfonate; calcium salt of 2,4,5-trichlorobenzenesulfonanilide-4'-sulfonate; sodium 4' [1,4,5,6,7,7-hexachlorobicyclo-[2.2.1]-hept-5-en-endo-2-yl]-benzenesulfonate; disodium hexafluoroglutarate; disodium chloranilate; and mixtures. These salts can be employed in amounts of about 0.01–10 weight percent based on the weight of the aromatic carbonate polymer composition.

The composition of the invention can also include fibrous glass such as disclosed in copending application Ser. No. 496,127 filed Aug. 9, 1974, assigned to the same assignee as this case. In addition, the composition of the invention can include the siloxanes disclosed in copending application, Ser. No. 496,115 filed Aug. 9, 1974, also assigned to the same assignee as this case. These copending applications are also incorporated herein by reference. Further, the instant composition can include both fibrous glass and siloxanes.

The aromatic polycarbonates that can be employed in the practice of this invention are homopolymers and copolymers that are prepared by reacting a dihydric phenol with the carbonate precursor.

The dihydric phenols that can be employed are bisphenols such as bis(4-hydroxyphenyl)methane, 2,2-bis(4-hydroxyphenyl)propane (hereinafter referred to as bisphenol-A), 2,2-bis(4-hydroxy-3-methylphenyl)-propane, 4,4-bis(4-hydroxyphenyl)pentane, 4,4-bis(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, (3,3'-dichloro-4,4'-dihydroxydiphenyl)propane, etc.; dihydric phenol ethers such as bis(4-hydroxyphenyl)ether, etc.; dihydroxybiphenyls such as p,p'-dihydroxybiphenyl, etc.; dihydroxyaryl sulfones such as bis(4-hydroxyphenyl)-sulfone, bis(3,5-dimethyl-4-hydroxy-phenyl)sulfone, etc.; dihydroxy benzenes, resorcinol, hydroquinone, alkyl-substituted dihydroxy benzenes such as 1,4-dihydroxy-3,5-dimethylbenzene, etc.; and dihydroxy diphenyl sulfoxides such as bis(4-hydroxy-phenyl)sulfoxide, etc. Other dihydric phenols can also be employed such as are disclosed in U.S. Pat. Nos. 2,999,835, 3,028,365 and 3,153,008 which are incorporated herin by reference.

It is, of course, possible to employ two or more different dihydric phenols or a copolymer of a dihydric phenol with a glycol or with hydroxy or acid terminated polyester, or with a dibasic acid in the event a carbonate copolymer or interpolymer rather than a homopolymer is desired for use in the preparation of the aromatic polycarbonates of the invention. Blends of any of the above materials can also be employed to provide the aromatic polycarbonate.

The carbonate precursor employed can be either a carbonyl halide, a carbonate ester or a haloformate. The carbonyl halides which can be employed herein are carbonyl bromide, carbonyl chlorlide and mixtures thereof. Typical of the carbonate esters which can be employed are diphenyl carbonate, di-(halophenyl) carbonate, such as di-(chlorophenyl) carbonate, di-(bromophenyl) carbonate, di-(trichlorophenyl) carbonate, di-(tribromophenyl) carbonate, etc., di-(alkylphenyl) carbonate such as di-(tolyl) carbonate, etc., di-(naphthyl) carbonate, di-(chloronaphthyl) carbonate, etc., or mixtures thereof. The suitable haloformates include bishaloformates of dihydric phenols (bischloroformates of hydroquinone, etc.) or glycols (bishaloformates of ethylene glycol, neopentyl glycol, polyethylene glycol, etc.). While other carbonate precursors will occur to those skilled in the art, carbonyl chloride, also known as phosgene, is preferred.

Also included are the polymeric materials of a dihydric phenol, a dicarboxylic acid and carbonic acid. These are disclosed in U.S. Pat. No. 3,169,121 which is incorporated herein by reference.

The aromatic polycarbonates of the invention are typically prepared by employing a molecular weight regulator, an acid acceptor and a catalyst. The molecular weight regulators which can be employed include phenol, cyclohexanol, methanol, para-tertiary-butylphenol, etc. Preferably phenol is employed as the molecular weight regulator.

The acid acceptor can be either an organic or an inorganic acid acceptor. A suitable organic acid acceptor is a tertiary amine and includes such materials as pyridine, triethylamine, dimethylaniline, tributylamine, etc. The inorganic acid acceptor can be one which can be either a hydroxide, a carbonate, a bicarbonate, or a phosphate of an alkali or alkali earth metal.

The catalysts which can be employed are those that typically aid the polymerization of the monomer with phosgene. Suitable catalysts include tertiary amines such as triethylamine, tripropylamine, N,N-dimethylaninline, quaternary ammonium compounds such as, for example, tetraethylammonium bromide, cetyl triethyl ammonium bromide, tetra-n-heptylammonium iodide, tetra-n-propyl ammonium bromide, tetramethylammonium chloride, tetramethyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

Also included are branched polycarbonates wherein a polyfunctional aromatic compound is reacted with the monomer and carbonate precursor to provide a thermoplastic randomly branched polycarbonate. These polyfunctional aromatic compounds contain at least three functional groups which are carboxyl, carboxylic anhydride, haloformyl, or mixtures thereof. Illustrative polyfunctional aromatic compounds which can be employed include trimellitic anhydride, trimellitic acid, trimellityl trichloride, 4-chloroformyl phthalic anhydride, pyromellitic acid, pyromellitic dianhydride, mellitic acid, mellitic anhydride, trimesic acid, benzophenonetetracarboxylic acid, benzophenonetetracarboxylic anhydride, and the like. The preferred polyfunctional aromatic compounds are trimellitic anhydride and trimellitic acid or their acid halide derivatives.

Blends of linear and branched aromatic polycarbonates are also included within the scope of this invention.

The compositions of the invention are prepared by admixing the aromatic polycarbonate with the organic alkali metal or alkaline earth metal salts and the partially fluorinated polyolefin or fluorinated polyolefin mixture.

DESCRIPTION OF THE PREFERRED EMBODIMENT

The following examples are set forth to illustrate the best mode currently known to practice the invention. Unless otherwise specified, parts or percents are by weight.

EXAMPLE 1

One hundred parts of an aromatic polycarbonate powder prepared by reacting 2,2-bis(4-hydroxyphenyl)-propane (hereinafter referred to as bisphenol-A) and phosgene in the presence of an acid acceptor and a molecular weight regulator and having an intrinsic viscosity of 0.57 dl/g was mixed with 0.5 parts of a finely divided poly(vinylidene fluoride). The resulting mixture was then fed to an extruder which was operated at about 265° C., and the extrudate was comminuted into pellets.

The pellets were then molded at about 315° C. into test samples measuring 2 in. by 3 in. by 0.062 in., using conventional molding techniques. The optical properties and surface color of the test samples were measured using the G. E. Recording Spectrophotometer described above and in accordance with ASTM Yellowness Index (YI) Test D1925-70. The results obtained are set forth in Tables I and II.

The pellets were also injection molded at about 315° C. into test bars measuring about 5 in. by ½ in. by about 1/16-⅛ in. thick. The test bars (5 for each additive listed in Table II) were subjected to the test procedure set forth in Underwriters' Laboratories, Inc. Bulletin 94, Burning Test for Classifying Materials (hereinafter referred to as UL-94). In accordance with this test procedure, materials so investigated are rated either UL-94 V-O, UL-94 V-I, UL-94 V-II, based on the results of 5 specimens. The criteria for each V rating per UL-94 is briefly as follows:

"UL-94 V-O": Average flaming and/or glowing after removal of the igniting flame shall not exceed 5 seconds and none of the specimens shall drip particles which ignite absorbent cotton.

"UL-94 V-I": Average flaming and/or glowing after removal of the igniting flame shall not exceed 25 seconds and one of the specimens shall drip particles which ignite absorbent cotton.

"UL-94 V-II": Average flaming and/or glowing after removal of the igniting flame shall not exceed 25 seconds and the specimens drip flaming particles which ignite absorbent cotton.

In addition, a test bar which continues to burn for more than 25 seconds after removal of the igniting flame is classified, not by UL-94, but by the standards of this invention, as "burning". Further, UL-94 requires that all test bars must meet the V type rating to achieve the particular rating. Otherwise, the 5 bars receive the rating of the worst single bar. For example, if one bar is classified as V-II and the other four (4) are classified as V-O, then the rating for all 5 bars is V-II.

The samples were also tested for impact strength according to the procedure set forth in ASTM D256, Method A. These results are also shown in Table II.

EXAMPLE 2

One hundred parts of the polycarbonate of Example 1 was mixed with 0.50 parts titanium dioxide pigment. The mixture was molded into test samples and their optical, impact and flammability properties were determined as described in Example 1. The results obtained are set forth in Tables I and II.

EXAMPLE 3

Example 1 was repeated except that the aromatic polycarbonate powder was mixed with 0.50 parts of finely divided poly(vinylidene fluoride) and 0.3 parts of sodium benzenesulfonate. The results obtained are shown in Table II.

EXAMPLES 4 TO 9

The procedures of Example 1 were repeated with the formulations shown in Table II along with the results of the test data obtained. The optical data for the Example 7 sample are also included in Table I.

In Table II, the following abbreviations are used to identify the salts and the polyolefins employed:
SBS—sodium benzene sulfonate
STC—sodium trichlorobenzene sulfonate
PDS—potassium diphenylsulfone-3-sulfonate
PSS—polysodium poly(styrenesulfonate)
PPC—polypotassium poly(4-chlorostyrenesulfonate)
PVF—poly(vinylidene fluoride)
PFE—poly(tetrafluoroethylene)

TABLE I

Optical Properties of Flame Retardant, Translucent Polycarbonate Compositions

| Sample of Example | $T_d$ (%) | $T_t$ (%) | D ($T_d/T_t$) | YI |
|---|---|---|---|---|
| 1 | 61.9 | 63.3 | 0.978 | 9.0 |
| 2 | 49.3 | 63.1 | 0.781 | — |
| 7 | 60.1 | 62.2 | 0.966 | 9.6 |

TABLE II

Optical, Physical and Flame Retardant Properties of Translucent Polycarbonate Compositions

| Sample of Example | Salt | pph | Polyolefin | pph | D ($T_d/T_t$) | Notched Izod (ft. lb./in.) | UL-94 Rating |
|---|---|---|---|---|---|---|---|
| 1 | — | — | PVF | 0.5 | 0.978 | 16.2 | V-II |
| 2 | — | — | * | 0.25 | 0.781 | 3.6 | V-II |
| 3 | SBS | 0.3 | PVF | 0.5 | 0.826 | 16.0 | V-I |
| 4 | SBS | 0.3 | * | 0.5 | 0.672 | 3.0 | V-I |
| 5 | STC | 0.2 | PVF | 0.25 | 0.871 | 16.0 | V-O |
| 6 | STC | 0.1 | PVF / PFE | 0.20 / 0.05 | 0.886 | 16.4 | V-O |
| 7 | PDS | 0.05 | PVF / PFE | 0.02 / 0.05 | 0.966 | 16.2 | V-I |
| 8 | PSS | 0.2 | PVF | 0.5 | 0.952 | 16.2 | V-I |
| 9 | PPC | 0.2 | PVF / PFE | 0.4 / 0.1 | 0.911 | 16.2 | V-O |

*Titanium dioxide used in place of partial and/or fully fluorinated polyolefin.

It is evident from the results shown in the foregoing Tables that a composition comprising a mixture of poly(vinylidene fluoride), a flame retardant organic salt and an aromatic polycarbonate exhibits good light-transmission and diffusivity, good thermal stability, flame retardancy and excellent toughness and impact strength.

What is claimed is:

1. A thermally stable, translucent and flame retardant polycarbonate composition consisting essentially of an admixture of an aromatic polycarbonate, a minor amount of a partially fluorinated polyolefin selected from the group consisting of poly(vinylidene fluoride), poly(vinyl fluoride), poly(trifluoroethylene), poly(chlorotrifluoroethylene) and poly(trifluoroethylene alkali metal sulfonate) or mixtures of said partially fluorinated polyolefin with poly(tetrafluoroethylene) and poly(hexafluoropropylene) and a minor amount of a flame retardant salt selected from the group consisting of an organic alkali metal salt or an organic alkaline earth metal salt or mixtures thereof.

2. The composition of claim 1 in which the aromatic carbonate is the reaction product of 2,2-bis(4-hydroxypheny)propane.

3. The composition of claim 1 wherein the partially fluorinated polyolefin is poly(vinylidene fluoride).

4. The composition of claim 1 wherein the partially fluorinated polyolefin-fully fluorinated polyolefin mixture is a poly(vinylidene fluoride)-poly(tetrafluoroethylene) mixture.

5. The composition of claim 1 wherein the partially fluorinated polyolefin or partially fluorinated polyolefin-fully fluorinated polyolefin mixture is present in an amount of from 0.01 to about 5.0 weight percent based on the weight of the polycarbonate composition.

6. The composition of claim 1 wherein the flame retardant salt is an alkali metal salt of an organic sulfonic acid.

7. The composition of claim 6 wherein the flame retardant salt is sodium benzenesulfonate.

8. The composition of claim 6 wherein the flame retardant salt is sodium trichlorobenzene sulfonate.

9. The composition of claim 6 wherein the flame retardant salt is potassium diphenylsulfone-3-sulfonate.

10. The composition of claim 6 wherein the flame retardant salt is polysodium poly(styrenesulfonate).

* * * * *

UNITED STATES PATENT AND TRADEMARK OFFICE
CERTIFICATE OF CORRECTION

PATENT NO. : 4,220,583
DATED : 9/2/80
INVENTOR(S) : Victor Mark

It is certified that error appears in the above-identified patent and that said Letters Patent are hereby corrected as shown below:

Column 4, line 45, typo "chlorlide" should be --chloride--.

Column 5, line 14, "ninline" should be --niline--.

Column 7, Sample 7, under "pph", "0.02" should be --0.20--.

Signed and Sealed this

Seventh Day of July 1981

[SEAL]

Attest:

RENE D. TEGTMEYER

Attesting Officer     Acting Commissioner of Patents and Trademarks